United States Patent
Mansoor et al.

(10) Patent No.: US 12,511,820 B2
(45) Date of Patent: Dec. 30, 2025

(54) METHOD AND DEVICE FOR THE PRECISE SELECTION OF A SPACE COORDINATE BY MEANS OF A DIGITAL IMAGE

(71) Applicant: NavVis GmbH, Munich (DE)

(72) Inventors: Fahad Mansoor, Munich (DE); Robert Huitl, Munich (DE); Raphael Neblich, Munich (DE); Lisa Cali, Munich (DE); Tamino Hartmann, Munich (DE); Stefan Romberg, Munich (DE); Georg Schroth, Munich (DE)

(73) Assignee: NavVis GmbH, Munich (DE)

( * ) Notice: Subject to any disclaimer, the term of this patent is extended or adjusted under 35 U.S.C. 154(b) by 314 days.

(21) Appl. No.: 17/910,939

(22) PCT Filed: Mar. 12, 2021

(86) PCT No.: PCT/EP2021/056352
§ 371 (c)(1),
(2) Date: Sep. 12, 2022

(87) PCT Pub. No.: WO2021/180932
PCT Pub. Date: Sep. 16, 2021

(65) Prior Publication Data
US 2023/0142545 A1    May 11, 2023

(30) Foreign Application Priority Data
Mar. 13, 2020  (DE) .................. 10 2020 107 010.1

(51) Int. Cl.
*G06T 15/20*    (2011.01)
*G01S 17/89*    (2020.01)
*G06T 7/70*    (2017.01)

(52) U.S. Cl.
CPC ............ *G06T 15/205* (2013.01); *G01S 17/89* (2013.01); *G06T 7/70* (2017.01);
(Continued)

(58) Field of Classification Search
CPC .................. G06T 15/205; G06T 19/00; G06T 2207/10028; G06T 2207/30204; G06T 2210/56; G06T 7/70; G01S 17/89
See application file for complete search history.

(56) References Cited

U.S. PATENT DOCUMENTS 7,712,046 B2    5/2010   Ngari
10,902,674 B2*  1/2021   Kawaguchi ............. G06T 7/536
(Continued)

FOREIGN PATENT DOCUMENTS

DE    10 2004 050 682 A1    6/2005
DE    10 2011 121 115 B4    6/2012
(Continued)

OTHER PUBLICATIONS

International Search Report dated Sep. 22, 2021 with Written Opinion for PCT/EP2021/056352, filed Mar. 12, 2021.
Maximize measurement accuracy with images overlaid on point clouds, published in Reconstruct Inc, Jan. 17, 2018 (4 pages) (www://medium.com/reconstruct-inc/Maximize-measurement-accuracy-with-images-overlaid-on-point-clouds-dca828f4a539).
Integration of panoramic photos and lidar, The Pointscene Diaries, Dec. 2017 (4 pages) (www://medium.com/the-pointscene-diaries/Integration-of-panoramic-photos-and-lidar-f577a45120e8).
(Continued)

*Primary Examiner* — Ming Wu
(74) *Attorney, Agent, or Firm* — Fleit Intellectual Property Law; Paul D. Bianco

(57) ABSTRACT

A device and method for precise selection of a space coordinate by means of a digital image. A digital image of surface elements in a three-dimensional space and a point cloud are provided, with space coordinates allocated to the points which form the point cloud, and surface elements allocated to the points in the three-dimensional space. The surface elements in the three-dimensional space are visualised by a first display. A pixel of the digital image is tagged, and approximated space coordinates for the tagged pixel are determined, which correspond to the surface element visualised by the tagged pixel in three-dimensional space. Sub- (Continued)

sequently, a supplementary view is superimposed, which displays the points of the point cloud located within a limited three-dimensional environment of the approximate space coordinates determined for the tagged pixel in a second display. Finally, a point of the point cloud is selected in the supplementary view.

10 Claims, 8 Drawing Sheets

(52) U.S. Cl.
CPC ............... *G06T 2207/10028* (2013.01); *G06T 2207/30204* (2013.01); *G06T 2210/56* (2013.01)

(56) References Cited

U.S. PATENT DOCUMENTS

| | | | |
|---|---|---|---|
| 11,315,262 B1* | 4/2022 | Cherevatsky | H04N 7/188 |
| 2004/0247174 A1* | 12/2004 | Lyons | G06T 7/55 382/154 |
| 2006/0016614 A1 | 1/2006 | Yokoyama | |
| 2010/0235736 A1 | 9/2010 | Fleisher | |
| 2014/0002440 A1* | 1/2014 | Lynch | G06T 19/00 345/619 |
| 2016/0266256 A1 | 9/2016 | Allen | |
| 2017/0269215 A1 | 9/2017 | Hall | |
| 2018/0307921 A1 | 10/2018 | Vallespi-Gonzalez | |

FOREIGN PATENT DOCUMENTS

| | | |
|---|---|---|
| EP | 2 388 615 A1 | 11/2011 |
| EP | 2913796 A1 | 9/2015 |

OTHER PUBLICATIONS

What AI can do for progress monitoring?, 2017 (7 pages) (www://medium.com/reconstruct-inc/what-ai-can-do-for-progress-monitoring-b4752fece5f).

Sternberg et al., Terrestrial 3D Laser Scanning—Data Acquisition and Object Modelling for Industrial As-Build Documentation and Architectural Applications, Proceedings of ISPRS XXXV Congress Jan. 2004 (6 pages).

Why higher Field of View important in First Person Shooters, dated Jul. 2017 (16 pages).

Watt, Input-Ace, New photo overlay tool for point clouds added to the input ace software, Nov. 2019 (8 pages).

Google Earth Studio—Camera Target & Multi-View, Mar. 8, 2019 (1 page).

Leica CloudWorx 4.0 for MicroStation, 2010 (6 pages).

Scanner2go GmbH '09—Leica CloudWorx 4.0 TruSpace—Scanner2GO, 2019 (1 page).

International Preliminary Report on Patentability with Written Opinion dated Sep. 6, 2022 for PCT/EP2021/056352, filed Mar. 12, 2021.

Scanner2go Gmbh, "09—Leica CloudWorx TruSpace—Scanner2GO", Nov. 10, 2019 (Nov. 10, 2019), Retrieved from the Internet: URL:https://www.youtube.com/watch?v=s6QVHPSgSKk.

Google Earth, "Google Earth Studio—Camera Target & Multi-View", Mar. 8, 2019 (Mar. 8, 2019), p. 1, Retrieved from the Internet: URL:https://www.youtube.com/watch?v=1qCu-uFDFvE.

\* cited by examiner

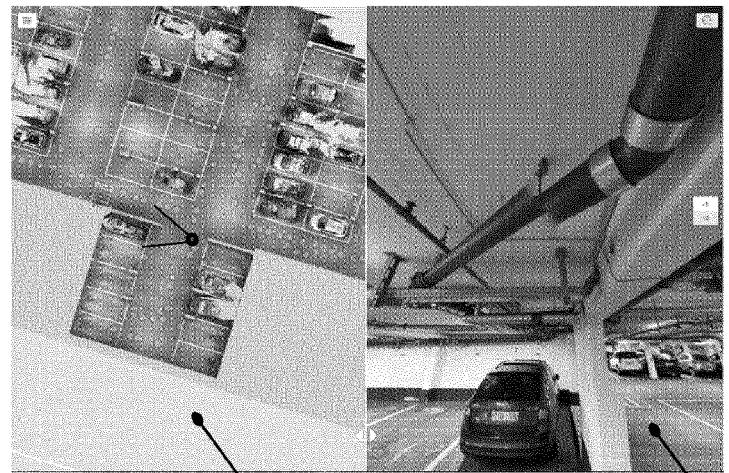
Fig. 5     19     15
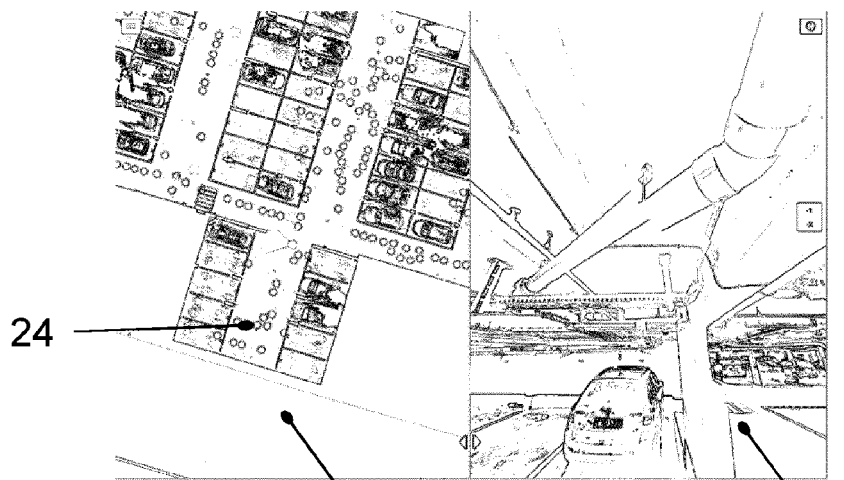
Fig. 6     19     15

METHOD AND DEVICE FOR THE PRECISE SELECTION OF A SPACE COORDINATE BY MEANS OF A DIGITAL IMAGE

FIELD OF THE INVENTION

The present invention relates to a computer-implemented method and a device for the precise selection of a space coordinate by means of a digital image.

BACKGROUND

The present invention relates to a computer-implemented method and a device for the precise selection of a space coordinate by means of a digital image.

It is known to measure a three-dimensional space in which objects are located, also referred to in the following as an object space. Such object spaces can be found inside buildings and on the exterior. There are different measuring systems known for the measuring of object spaces.

For example, one such system is described in EP 2 913 796 A1. In this case, a laser scanner is used in connection with several cameras. A point cloud is generated from the signals of the laser scanner from which a three-dimensional building model of the object space is created. A panorama image can be generated from the images of the cameras, which shows the object space as a digital image.

When point clouds are captured by means of laser scanners, systems are generally employed in which a laser beam is emitted by a mirror rotating on an axis in one level in the space. Alternatively, solid-state lasers without moveable parts can be employed to generate a rotating laser beam. The data delivered in this way generally includes, for each data set (point of the cloud), the respective time stamp for the respectively emitted laser impulse, with the associated angulation within the rotational axis. Additionally, each data set contains one or several values which are derived from one or from several successively received reflection signals, and which specify the distance between the respective reflecting surfaces in the direction of the beam being emitted, and the associated intensities of reflection, said distances being calculated from the laser light period. From this, in combination with the intensities of the reflection signals, three-dimensional point coordinates can be calculated, which then form the points of the point cloud. To be able to build up a consistent three-dimensional model from the measurement processes by means of a moved laser scanner, it is necessary to capture both a timestamp and the exact positional orientation of the laser scanner in the space for every measurement.

Different laser scanners are known from DE 10 2011 121 115 B4 or DE 10 2004 050 682 A1. Additionally, a multifeed scanner is known from EP 2 388 615 A1 and US 2017/0269215 A1, which emits signal beams in the form of a fan and measures the reflections of these signal beams.

The image information of panorama cameras consists of image files which are provided with a timestamp of the time of recording. If the exact position and orientation of the respective camera in the space is known for each timestamp and each file, a digital panorama image can be generated. Additionally, the image data and the point cloud data can be allocated to one another through the utilisation of camera parameters which are either known or are to be determined by calibration, such as focal distance and image characteristics, as well as sensor size and resolution. In this way, an object space can be recorded in three dimensions.

Panorama images are used here to enable a virtual tour through the recorded object space which is very true to reality. Here the image files stand in the foreground, which, by means of so-called "stitching" with the aid of the 3D information (position and orientation, i.e., the pose of the respective camera in the space), can be combined to form uninterrupted 360-degree panoramas, which correspond to the exact perspective on a particular point of the surroundings, as would be perceived by an on-site observer. Here the totality of the panorama images represents a multiplicity of individual, discrete positions at which the underlying images have been recorded. The observer can simply jump from one discrete position to another discrete position and change from panorama image to panorama image, as opposed to the abovementioned point cloud model, which can be "flown through" continuously, and whose points are allocated to space coordinates of surface elements of the captured object space.

To gain depth information approximated for panorama cameras, so-called Time-of-Flight cameras are known, which emit a flash of light and, for every pixel of the camera sensor, determine the individual point in time at which the reflection signal is captured, so that, using the light duration, it gives distance information for the relevant pixel. However, because of their low resolution and their limited range and precision, Time-of-Flight cameras are not suited for the detailed capture of large buildings.

The same applies to stereo depth cameras, which gain depth information from the parallax information of two camera images in a similar way to the human eye. Here too, the precision and resolution are insufficient for measuring purposes.

Additionally, photogrammetric methods are known, in which a textured 3D model can be generated from a multiplicity of images of one and the same object, or of the same environment, taken from different angles, for example by the utilisation of the so-called Bundle Adjustment process, wherein the positions of the points in the 3D space, the positions and orientations of the observing cameras, and the internal calibration parameters of those cameras are adapted simultaneously to the mapping images in an optimisation process. These methods yield good results for well-textured surfaces, but fail for surfaces which are the same colour or which lack distinctive features, and likewise for complicated intersections and reflective objects. Here too the precision and resolution are insufficient for measuring purposes.

The data gained by the capture of the object space can be used to visualise the three-dimensional space. Visualisations of this kind can in turn be used to measure objects or objects in the space. Additionally, the visualisation can be used for a so-called computer-aided augmentation of reality perception (Augmented Reality). In the different applications, the need arises to select a space coordinate precisely by means of a digital image. Here, the problem arises that two pixels located very close to each other in the digital image are in some instances allocated space coordinates which are a very significant distance apart.

SUMMARY OF THE INVENTION

One aspect of the present invention is to provide a computer-implemented method and a device, with which a space coordinate can be precisely selected by means of a digital image.

Accordingly a method and a device are disclosed herein. Advantageous embodiments and developments are also disclosed.

In the method according to the invention, a digital image of surface elements in a three-dimensional space is provided. Additionally, a point cloud is provided, wherein space coordinates are allocated to the points which form the point cloud and surface elements are allocated to the points in the three-dimensional space. The surface elements are visualised in the three-dimensional space by means of a first display of the digital image. Subsequently, a pixel of the digital image is tagged, and approximated space coordinates are determined for the tagged pixel, which correspond to the surface element visualised by the tagged pixel in three-dimensional space. Additionally, a supplementary view is superimposed in the method according to the invention, which displays, in a second display, the approximated space coordinates determined for the tagged pixel, located on the points of the point cloud in a limited three-dimensional environment. Finally, a point of the point cloud displayed in the supplementary view is selected.

A point cloud is understood in the sense of the invention to be a quantity of points of a vector space, which has a disorganised spatial structure, namely a cloud. A point cloud is described by the points contained, which are respectively ascertained by their space coordinates. Additional attributes can be recorded with respect to the points, for example geometric normals of the associated surface elements, reflection intensities, colour values and/or measurement accuracies. As described in the introduction, a point of the point cloud can be generated, during recording of the three-dimensional space, by a scanner beam in the space coordinates of the point having been diverted, in particular reflected, by a surface element The limited three-dimensional environment is in particular a volume around the approximated space coordinates ascertained for the tagged pixel, in particular a cubic volume, which contains the approximated space coordinates ascertained for the tagged pixel.

After a point of the point cloud displayed in the supplementary view has been selected, the space coordinates of the selected point of the point cloud can be ascertained in the method according to the invention.

In the visualisation of the points of a point cloud, which can, for example, also take place via browser-based platform over the internet, the problem arises that the resources required for the calculation and data transfer become very substantial as soon as the visualised three-dimensional space is depicted sufficiently extensively and in enough detail and, for example, displays the inside of a building with different rooms and floors. Consequently, a fluid alteration of the visualisation of the three-dimensional space with the aid of the display of points of a point cloud is difficult with current common computing and data transfer capacities. This problem is solved by the method according to the invention. The method according to the invention advantageously combines specifically the visualisation of the three-dimensional space by a digital image with the precise information which can be provided by a point cloud of the three-dimensional space. However, the whole visualised space is not reproduced here in the second display of the points of the point cloud, but rather only a limited three-dimensional environment of a pixel which has been tagged in a digital image. In this way, the computing effort for the visualisation of the point cloud is so significantly reduced, that a fluid display of the three-dimensional space and the selection of a space coordinate within it is possible, wherein the selection of space coordinate by means of the points contained in the second display of the supplementary view can take place, such that the space coordinate can be selected very precisely.

According to an embodiment of the method according to the invention, the digital image visualises the surface elements of the three-dimensional space via a two-dimensional projection from a first recording pose in a first recording position with a first opening angle of a first virtual or real camera in the direction of the recorded three-dimensional space. In this way, the digital image shows a visualisation of the recorded three-dimensional space from a first recording pose, said visualisation being highly realistic. Since this is a two-dimensional projection of the recorded three-dimensional space, however, the digital image does not visualise any depth information, or at least not any exact depth information. However, the digital image can contain further approximated depth information according to a development of this embodiment of two-dimensional pixels. The depth information belonging to a respective pixel is the spacing that the surface element of the three-dimensional space depicted by the pixel in question has, at a set point, for example the eyepoint, or from a set plane, for example the image plane, or the real or virtual camera. In this way, the approximated space coordinates of a tagged pixel may be immediately obtained from the digital image. It should be noted, however, that the depth information contained in a digital image is too imprecise for many applications, especially measuring applications.

According to a further embodiment of the method according to the invention, a second recording pose is allocated to the second display in a second recording position and a second opening angle is allocated to a second virtual camera, which determines the perspective of the display of the limited three-dimensional environment. The supplementary view reproduces, from a different recording pose, the three-dimensional environment of the surface element visualised by the tagged pixel, wherein the points of the point cloud visualise this three-dimensional environment instead of a realistic digital image.

The display scale of the second display of the supplementary view is in particular larger than the display scale of the first display of the digital image. In this way, the supplementary view is in particular a magnified view, in which a particular area of the digital image is displayed enlarged. The specific feature of the enlarged view, however, is that it is not the pixels of the digital image which are depicted, but rather points of a point cloud which comprise exact space coordinates of surface elements of the captured three-dimensional space.

To attain a larger display scale in the supplementary view, the second recording position in particular is located closer than the first recording position to the approximated space coordinates ascertained for the tagged pixel. The second recording position is in particular located on a straight line which goes through the first recording position and the approximated space coordinates ascertained for the tagged pixel, and indeed between the first recording position and the approximated space coordinates ascertained for the tagged pixel. In this way, the visual angle visualised in the first and second displays is the same. The second recording position is simply nearer than the first recording position to the approximated space coordinates ascertained for the tagged pixel.

According to a development of the method according to the invention, the second recording pose of the second virtual camera is calculated in the second display of the supplementary view or in a first supplementary display, depending upon the normals of the surface element in the three-dimensional space visualised by the tagged pixel, or depending on the normals of the surface elements in the environment of the approximated space coordinates ascertained for the tagged pixel. In this case, the perspective of the visualisation in the second display therefore differs from that of the first display. It is dependent on the normal of the surface element visualised by the tagged pixel. In this way, in the second display of the points of the point cloud, a particularly precise view of the environment of the surface element visualised by the tagged pixel is gained. Further, due to the slight, automatically occurring change in the display perspective when the cursor is moved over neighbouring pixels, a motion parallax effect that is advantageous for the human spatial perception of the displayed section of the point cloud is achieved without the need for additional operating process, for example the use of a keyboard, for the purpose of the manual control of the slight change in perspective.

The distance of the approximated space coordinates ascertained for the tagged pixel from the first and/or second recording position (i.e., from the associated eyepoint, or alternatively from the associated image plane) can be shown in the first display and/or the second display.

According to a further embodiment of the method according to the invention, the distance of the second recording position from the approximated space coordinates ascertained for the tagged pixel is adapted dynamically to the surface elements contained within the limited three-dimensional environment. For example, if particularly finely structured surface elements are displayed in the three-dimensional environment, the distance between the second recording position and the space coordinates ascertained for the tagged pixel can be narrowed to attain a more detailed view in the display of the points of the point cloud. Here, a motion parallax effect that is advantageous for human spatial perception of the section of the point cloud displayed is likewise achieved by the movements of the display perspective inwards and outwards, without further operating processes being necessary, for example the use of a keyboard, for the manual shifting of the display perspective.

Alternatively, the distance of the second recording position from the approximated space coordinates ascertained for the tagged pixel can also be fixedly pre-determined. In this case, the observer can more easily orientate themselves in the second display using the points of the point cloud. Here too the perspective in the second display moves automatically slightly inwards or outwards when the mouse is moved over neighbouring pixels, whereby a parallax motion effect that is advantageous for human spatial perception of the section of the point cloud displayed is achieved again without further operating processes being necessary, for example the use of a keyboard, for the manual shifting of the display perspective.

According to a further embodiment of the method according to the invention, the limited three-dimensional environment of the space coordinates ascertained for the tagged pixel comprises only points whose space coordinates have a distance from the first and/or second recording position which is less than a threshold distance. In particular, such points of the point cloud are not displayed whose space coordinates are too distant from the first or second recording position. In this way, if a pixel in the two-dimensional image is located in the immediate proximity of the tagged pixel, and the approximated space coordinates ascertained for this pixel differ from the approximated space coordinates ascertained for the tagged pixel in such a way that, in relation to the first recording position, the space coordinates of this pixel are located far behind the space coordinates of the tagged pixel, the space coordinates of this pixel lie outside the limited three-dimensional environment. In the second display of the three-dimensional environment, this area can, for example, be displayed as empty, i.e. black or white. For this area, which is located further back, no points of the point cloud are displayed. In this way, an erroneous selection of a spatially distant point is avoided, where its associated pixel is nevertheless located in the immediate proximity of the tagged pixel in the digital image. If the threshold distance from the second recording position becomes a dynamic selection criterion, a selection of partial sections of the point cloud is hereby automatically carried out when moving the cursor over neighbouring pixels, which corresponds to an automatic shift of the clipping plane. In this way, the foreground automatically and dynamically moves away from the background, without the need for additional operating processes, for example the use of a keyboard, for the manual shifting of the clipping plane.

Alternatively, instead of completely hiding points of point clouds beyond threshold distances, the colour display of the points can also be varied in the second display of the supplementary view, depending on the distance from the first or second recording position. For example, points located nearer can be displayed in a lighter shade, and points located further away can be displayed in a darker shade, wherein, for example, either the captured real colour value of the corresponding surface element is adapted to the brightness, or a depth-map display in false colours can occur, in which nearer points are shown lighter in shades of grey, and points located further away are shown in darker shade, or vice versa. If this colour display occurs depending on the second recording position, then here too an automatic dynamic adaptation of the virtual lighting and a dynamic shading results when the cursor is moved over neighbouring pixels, which serves for improved human spatial perception. The effect achieved is similar to the lighting of parts of a larger object with a dynamic light source, which is moved towards or away from parts of the object. Advantageously, here too there are no further manual operating processes necessary for the adjustment of virtual lighting parameters.

In a further advantageous embodiment, a known rendering or shading method for computer graphics is used, and parameters of this method, for example the position of a virtual light source, are changed, depending on the normals of the surface element visualised by the tagged pixel in the three-dimensional space, or depending on the normals of the surface elements in the environment of the approximated space coordinates ascertained for the tagged pixel. Here too results a dynamic adaptation, for example of the virtual lighting, and with it a dynamic shading, when the cursor is moved over neighbouring pixels, which serves for improved human spatial perception, wherein, advantageously, no further manual operating process for the adjustment of the aforementioned rendering and shading parameters is necessary.

The threshold distance can here depend on the distance between the approximated space coordinates ascertained for the tagged pixel and the first recording position. If this distance is larger, then a larger threshold distance can be selected. If, on the other hand, this distance is smaller, then a smaller threshold distance can be selected.

According to a further embodiment of the method according to the invention, the tagged pixel is displayed with highlighting. Furthermore, the normals and/or the surface tangents of the surface element visualised by the tagged pixel can be shown in the first and/or the second display. In this way, which pixel is currently tagged and the nature of the geometry of the associated surface element can be easily recognised.

According to a further embodiment of the method according to the invention, a second supplementary display of the surface elements, or of the points of the point cloud in the three-dimensional space, is generated and shown, wherein the second supplementary display shows the three-dimensional space from a different perspective from the first display of the digital image. According to a development, in the second supplementary display, a first indicator for the first recording position and/or a second indicator for the direction of recording and/or the opening angle of the first virtual or real camera and/or a third indicator for the approximated space coordinates of the tagged pixel are shown.

The second supplementary display is in particular displayed next to the first display. In the second supplementary display, it can in particular be easily recognised whether the pixel associated with the desired surface element has been tagged in the first display, or whether, in some instances, a pixel has been located which is associated with a surface element located much further behind, which is nevertheless located in the proximity of the tagged pixel. This becomes visible via the other perspective of the first supplementary display. Additionally, the indicators make it immediately visible as to how the digital image of the first display was recorded. The second supplementary display is in particular a view from above. Alternatively, it can also be a view from below or from the side. Due to the different perspectives on the first display, the observer can orientate themselves more easily in the first display, because they can more easily recognise the nature of the depth information of the digital image. However, a specific space coordinate cannot be precisely selected with the aid of the second supplementary display, because the points of the point cloud are not directly displayed in this overview display.

According to a further embodiment of the method according to the invention, in the first and/or second display, the digital image and/or the points of the point cloud are displayed in false colours. The false colours can, for example, be derived from the reflection intensity determined from the recording of the data for the point cloud with the assistance of a laser scanner and/or from the direction from which the point in question was scanned.

Additionally, in the method according to the invention, observations saved in the second depiction of the supplementary view, which were connected to particular positions in space, can be shown, wherein these are only shown depending on the section of the limited three-dimensional environment displayed.

Additionally, the second display can be a stereoscopic or autostereoscopic display of the limited three-dimensional environment.

In the method according to the invention, the digital image can also be a map view or a drawing. In this case, the supplementary view reveals details which are not visible in the map view.

According to an embodiment of the method according to the invention, the digital image is a panorama image composed of a multiplicity of individual digital images. In this case, the first recording pose is optionally a virtual recording pose, because the individual images of the panorama image have optionally been recorded from different recording poses. Furthermore, a multiplicity of panorama images can be provided, so that the first display of a panorama image can jump to another panorama perspective.

Additionally, the digital image can be a virtual, computer-generated image, which has been rendered from three-dimensional data or point cloud data.

In the method according to the invention, the point cloud is specifically generated by means of a laser scanner. According to an embodiment of the method according to the invention, space coordinates are allocated to a point of the point cloud, at which a surface element is located, which has deflected a laser beam of the laser scanner while capturing the three-dimensional space.

According to a development of the method according to the invention, no points of the point cloud are allocated to a subset of the surface elements which are the first display of the digital image, such that the point cloud displays fewer surface elements than the digital image. In particular, the point cloud has been recorded at an earlier point in time than the digital image, such that certain surfaces, for example of walls and ceilings in the construction of a building which has been captured, were not yet present. In this way, when the point cloud is displayed, it is possible to see through surfaces of the digital image, as particular surface elements do not obscure the view of the surface elements located behind them.

According to a further embodiment of the method according to the invention, the second display comprises a sectional view in the supplementary view. The sectional view can be adapted to the environment displayed, for example to remove points on the floor.

Additionally, surface elements in the second display of the supplementary view, to which defined classification attributes are allocated, can be displayed differently or not at all. For example, surfaces classed as moveable objects may not be displayed.

Furthermore, a classification attribute of at least one surface element for which points of the point cloud are displayed in the second display, can be shown in the second display of the supplementary view. For example, it can be shown which surface elements belong to a specific pipe or to another structural element.

Additionally, the point cloud can be segmented in at least one plane in the limited three-dimensional environment. The points of the plane are then displayed in the second display.

Additionally, the pixels can be rendered in the second display of the supplementary view with a lower brightness than in the first display of the digital image, with the exception of the tagged pixel.

At least two modes can be defined for the second display of the supplementary view. During the display of the points of the point cloud in the second display, it is then possible to change between the different modes by means of an operating process. For example, if the display of the points of the point cloud is changed, they can be displayed thinner or thicker. Where it displays the points thicker, the second display is more similar to the first display.

Moreover, a rotation of the point cloud can be carried out for the second depiction in the supplementary display by means of an operating process, such that the points of the point cloud are depicted in the rotated position.

Furthermore, a change of the recording pose and/or of the opening angle of the second virtual camera can be carried out, by means of an operating process, for the second display in the supplementary display, so that the points of the point cloud can be displayed from a different perspective.

According to a further embodiment of the method according to the invention, a third or further supplementary displays can be superimposed in the supplementary display in addition to the second display, with, respectively, altered first and/or second recording poses, and/or opening angles of the respective virtual cameras, such that the points of the point cloud can simultaneously be displayed from one or from several other perspectives. Instead of or in addition to the altered perspectives, the display types can also be varied in the third or additional displays, for example as regards the display of colour, the size of the points or virtual lighting parameters as previously described.

Additionally, in the method according to the invention, the distance of the approximated space coordinates ascertained for the tagged pixel from the selected point of the point cloud can be calculated and shown.

According to an embodiment of the method according to the invention, a pixel of the digital image is tagged by the moving of a cursor over the first display of the digital image by means of an input device, for example an electronic mouse. In the supplementary view; the three-dimensional environment of the approximated space coordinates determined for the pixel on which the cursor of the input device is located is then displayed respectively as a second display. In this way, the second recording position and/or recording pose is changed when the tagged pixel is changed. If the cursor is moved over the display of the digital image, the second recording position and/or recording pose in the display is therefore constantly adapted to the respective tagged pixel. This is also possible with regards to limited calculation or data-transfer capacities, as only the limited three-dimensional environment is displayed in the second display.

Alternatively, in the method according to the invention, the second recording pose can also remain unchanged, either automatically or by means of an operating process, even when the approximated space coordinates provided for the tagged pixel change, such that measurements and/or selection or operating processes can be carried out concerning individual points of the point cloud within the three-dimensional environment displayed in the supplementary view:

According to a further embodiment of the method according to the invention, pixels representing edges are determined in the first display. When the cursor of the input device is moved from a pixel which displays an edge to a pixel which does not belong to this edge, the second display is then subsequently also displayed in the supplementary view for the pixel which displays an edge if the cursor of the input device is already located on the pixel which does not belong to the edge. In this way, a discontinuous change in the second recording pose in the event of a small movement of the cursor can be advantageously avoided. The supplementary view only jumps or 'snaps' to the pixel which does not belong to the edge when the cursor of the input device is a certain distance away from the pixel which depicts the edge, or as soon as a certain number of further movement events have taken place, or a certain interval of time has passed. If the cursor is moved from a pixel which displays an edge to a pixel which does not belong to the edge, and is then moved back to the pixel which belongs to the edge, the three-dimensional environment of the edge is displayed in the supplementary view throughout. Therefore, the display 'rests' on the edge within a certain threshold of cursor movement. There is no jump to a three-dimensional area which in some instances lies far behind the space depicted by the digital image.

The present invention additionally relates to a computer-implemented measuring method for determining the distance between two points in the three-dimensional space. In this method, a first point displayed in the point cloud is selected by means of the previously described method. First space coordinates of the first point are determined for this. Further, a second point of the point cloud displayed in the supplementary view is selected by means of the method previously described. Second space coordinates are also determined for this second point. Then the spatial distance of the first point from the second point is calculated from the first and second space coordinates.

Using this method, the distance between two points in the three-dimensional space can be determined very precisely, using data which had previously been captured from the three-dimensional space. This data comprises of a digital image of the space and a point cloud.

The present invention additionally relates to a computer-implemented method for cutting out a surface segment which is displayed in a digital image. A multitude of points of the point cloud are selected here by means of the previously described method, and a surface segment in the digital image is demarcated and cut out by means of the selected points. This method is advantageous because, when the surface segment is cut out, it is the points of the point cloud that are used, which display exact measurement values when the three-dimensional space is captured, rather than the data of the digital image, which is imprecise in some cases. Thus, imprecision arising from artefacts, which in some cases appear during the generation of the digital image, do not disadvantageously influence the process of cutting out the surface segment.

Finally, the invention relates to a device for the precise selection of a space coordinate by means of a digital image. The device has a memory in which data about at least one digital image of surface elements in a three-dimensional space and about a point cloud is saved, wherein space coordinates are allocated to the points which form the point cloud and surface elements are allocated to the points in the three-dimensional space. Additionally, the device comprises a piece of visualisation equipment, which is linked to the memory by a data link, and which is equipped to visualise the surface elements in three-dimensional space by a first display of the digital image. Additionally, the device comprises an input device for tagging a pixel by means of a cursor. Finally, the device has a computing unit, which is equipped to provide approximated space coordinates for the tagged pixel, which correspond to the surface element visualised by the tagged pixel in three-dimensional space. Here the visualisation equipment is further equipped to generate and superimpose a supplementary view, which displays, in a second display, the points of the point cloud located in a limited three-dimensional environment of the approximated space coordinates determined for the tagged pixel. Additionally, a point of the point cloud displayed in the supplementary view is selectable by means of the input device.

The device according to the invention is in particular designed to implement the previously described method. In this way, it has the same advantages as this method.

The device is in particular a device for data processing, specifically a computer, comprising means to implement one of the methods previously described.

The invention also relates to a computer program product, comprising commands which, when the program is executed by a computer, prompt this computer to implement one of the methods previously described.

Additionally, the invention relates to a computer-legible storage medium, comprising commands which, when executed by a computer, prompt this computer to implement one of the methods previously described.

BRIEF DESCRIPTION OF THE DRAWINGS

In the following, the invention is illustrated by means of an exemplary embodiment with reference to the drawings.

FIG. 5 shows another further display generated by the method according to the invention, FIG. 6 shows an alternative display to the display shown in FIG. 5.

DETAILED DESCRIPTION

Figure 1:
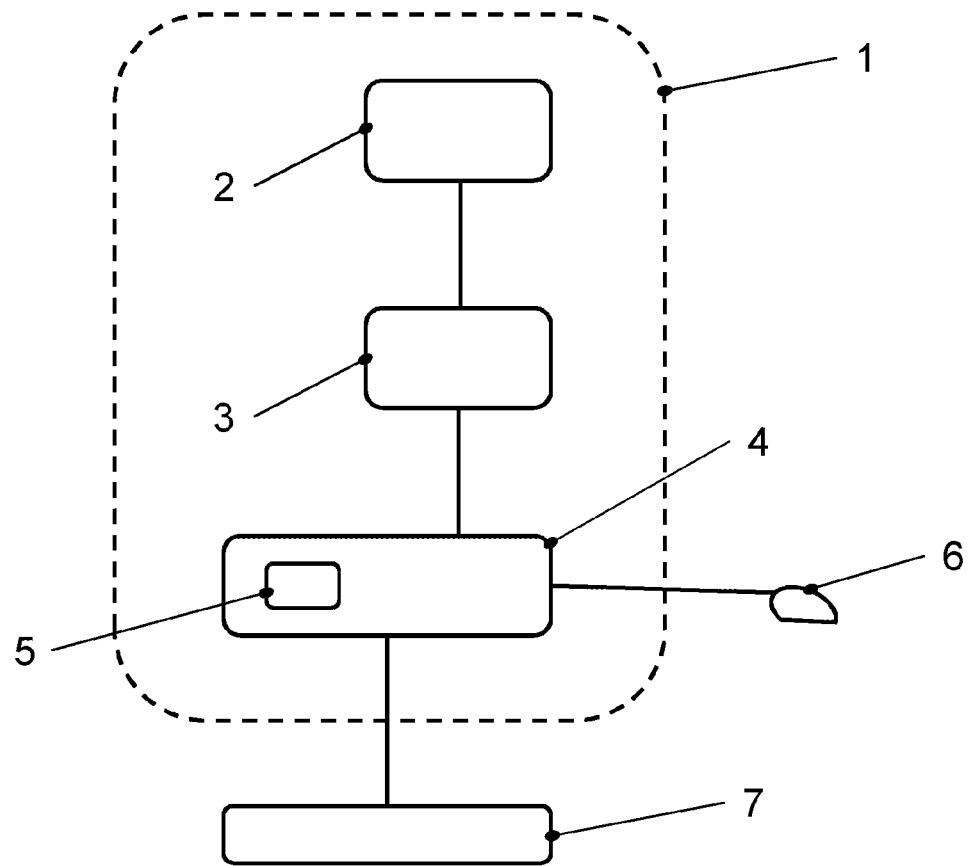
FIG. 1 shows an exemplary embodiment of the device according to the invention.

An exemplary embodiment of the device according to the invention for the precise selection of a space coordinate by means of a digital image is firstly described with reference to FIG. 1:

The device comprises a piece of data processing equipment 1, for example a computer, which has a memory 2, a piece of visualisation equipment 3, a controller 4 having a computing unit 5. In the memory 2, data about at least one digital image of surface elements in a three-dimensional space is saved. In the exemplary embodiment, a multiplicity of digital images is saved in the memory 2, wherein each one is a panorama image compiled from a multiplicity of individual digital images. The individual digital images were recorded from different recording poses in the three-dimensional space and then compiled to form the panorama image. The individual images are digital photos.

The digital image is composed of two-dimensional pixels. Further, approximated depth information for each pixel is saved in the memory 2. The depth information is the distance of the surface element of the three-dimensional space depicted by the relevant pixel from a set point or a set plane of a virtual or real camera.

In alternative exemplary embodiments, the digital image can also be a map view or a drawing. It can also be a virtual computer-generated image, which has been randomly generated.

Furthermore, data about a point cloud is saved in the memory 2. This data has been generated by means of a laser scanner. Here, a laser beam of the laser scanner is reflected on a surface element in the three-dimensional space and the reflected beam is captured by the detector. In this way, a point belonging to the surface element can be generated, to which space coordinates are allocated, and to which the surface element is allocated in the three-dimensional space. A multiplicity of such points, to which different space coordinates and different surface elements are allocated respectively, form the point cloud saved in the memory 2. In this way, a point of the point cloud represents a measurement value of the laser scanner. This measurement value can comprise at least the exact space coordinates of a surface element allocated to the point.

The memory 2 is connected by a data link to the visualisation equipment 3. The visualisation equipment 3 is equipped to visualise the surface elements in the three-dimensional space by a first display of the digital image, as will later be explained with reference to the exemplary embodiment of the method according to the invention. The first display is a realistic display of the captured three-dimensional space. It is a photo, or at least resembles at least a photographic display, when this is a panorama image.

Furthermore, the visualisation equipment 3 is equipped to generate and superimpose a supplementary view, as will later be explained with reference to the exemplary embodiment of the method according to the invention. In the supplementary view, points of the point cloud are displayed in a second display. This is a visualisation of the point cloud in a limited spatial region.

The visualisation equipment 3 is connected to the controller 4. The controller 4 is connected in turn to an input device 6 and a display device 7. The input device 6 may, for example, be an electronic mouse.

The controller 4 controls the display device 7 in such a way that the displays generated by the visualisation equipment 3 are shown on the display device 7. With the input device 6, a pixel can be tagged and selected by means of a cursor shown in the display of the display device 7. These operating processes carried out by means of the input device 6 are recorded by the controller 4, which can generate control signals depending on the inputs, which among other things, can change the visual display on the display device 7. Furthermore, control signals can be transmitted by operating processes to the visualisation equipment 3, which then generates altered displays for the displays on the display device 7.

The memory 2 and the visualisation equipment 3 can also be provided by a central server, which, for example, is connected to a local computer of a user by a data connection. In this case, the controller 4 corresponds to the user computer or to a piece of software executed on the user computer, or an application carried out within a browser program running on the user computer. The controller 4 comprises in turn the computing unit 5 and is connected to the input device 6 as well as the display device 7. The connecting line between the visualisation equipment 3 and the controller 4 then represents the data connection, for example over the internet.

Figure 2:
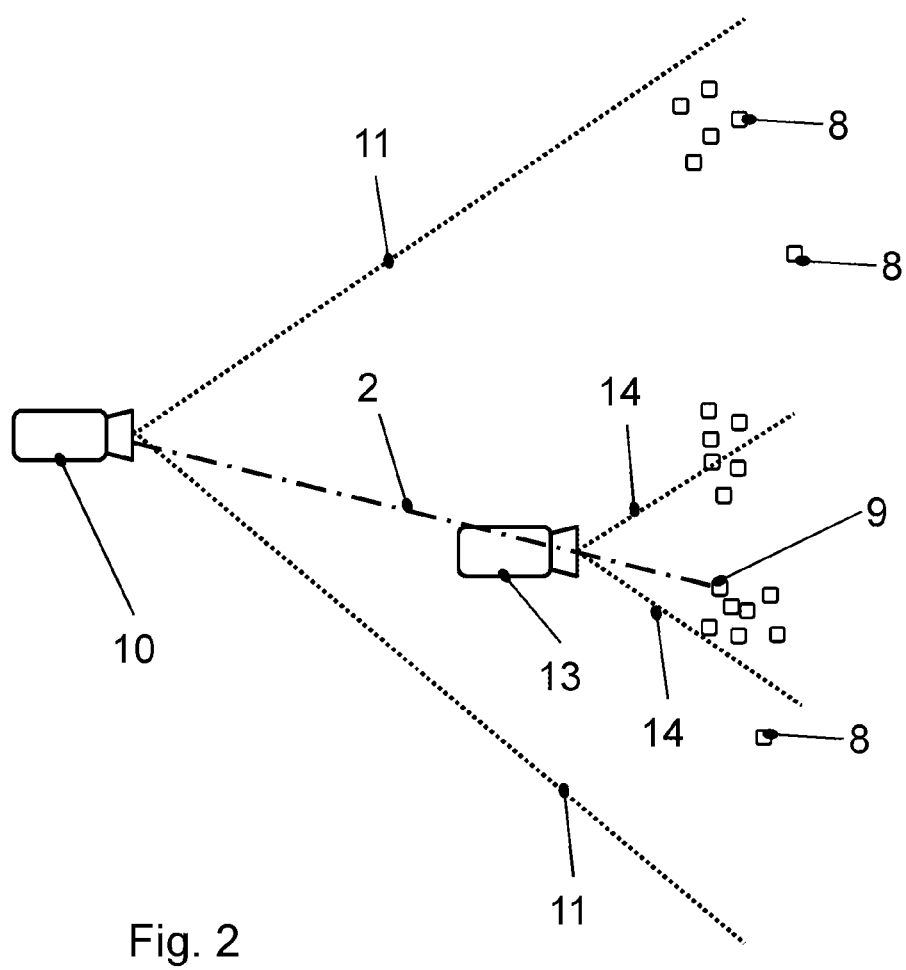
FIG. 2 illustrates the capture and display of surface elements in a three-dimensional according to an exemplary embodiment of the method according to the invention.

The displays generated by the visualisation equipment 3, as they are used in the exemplary embodiment of the method according to the invention, are illustrated with reference to FIG. 2:

A multiplicity of surface elements 8, 9 are located in the three-dimensional space. The first display of the digital image visualises the surface elements 8, 9 of the three-dimensional space by a two-dimensional projection from a first recording pose in a first recording position with a first opening angle of a first virtual or real camera 10 in the direction of the recorded three-dimensional space. The opening angle of the camera 10 is here determined by the beams 11, and the recording pose is determined by the position and alignment of the camera 10, as shown in FIG. 2.

As will later be explained with reference to the method according to the invention, a surface element 9 is highlighted. A pixel of the digital image representing this surface element 9 has been tagged by means of the input device 6.

A second recording pose is allocated to the second display of the supplementary view in a second recording position and a second opening angle is allocated to a second virtual camera 13. The second opening angle is determined by the beams 14. The second recording pose and the second recording position result from the arrangement and positioning of the virtual camera 13, as shown in FIG. 2. In the example shown in FIG. 2, the second recording direction corresponds to the first recording direction and the second opening angle to the first opening angle. The second recording position, however, is located on a straight line which is formed from the first recording position and the surface element 9, more specifically between the first recording position and the surface element 9, as depicted in FIG. 2. In this way, the second virtual camera 13 is located nearer to the surface element 9 than the first camera 10. Correspondingly, the display scale of the second display of the supplementary view is larger than the display scale of the first display of the digital image.

The distance of the second recording position from the approximated coordinates determined for the tagged pixel can be exactly predefined. Alternatively, this distance can also be dynamically adapted to the surface elements 8, 9 contained within the limited three-dimensional environment.

In a further exemplary embodiment, a first supplementary display can be generated alternatively or additionally by the visualisation equipment 3, in which the second recording pose of the second virtual camera 13 is changed. For example, the second recording pose of the second virtual camera 13 can be calculated depending on the normals of the surface element 9 visualised by the tagged pixel in the three-dimensional space, or depending on the normals of the surface elements 8 in the environment of the approximated space coordinates determined for the tagged pixel.

It is noted that the recording poses of cameras 11 and 13 need not correspond to real recording poses of cameras or scanners which have recorded the data relating to the digital image and/or the point cloud. The cameras 10 and 13 shown in FIG. 2, which may in some cases be virtual, only visualise the displays generated by the visualisation equipment 3. The observer perceives these displays as if they were perceiving the three-dimensional space with the surface elements 8, 9 from the perspective of cameras 10 and 13.

In the following, an exemplary embodiment of the method according to the invention is explained, wherein the exemplary embodiment of the device according to the invention is further explained. Here, reference will be made to FIGS. 3 to 10, which show visual displays shown on the display device 7, which are produced by means of the exemplary embodiment of the method according to the invention and by the exemplary embodiment of the device according to the invention.

In the method according to the invention, a digital image of surface elements 8, 9 in a three-dimensional space is first prepared. Further, a point cloud is provided, wherein space coordinates are allocated to the points which form the point cloud and surface elements 8, 9 are allocated to the points in the three-dimensional space. The provision of the digital image and the point cloud can be achieved by the memory 2 of the data processing equipment 1.

In the method, the surface elements 8, 9 are then visualised in the three-dimensional space in a first display 15 of the digital image, as is shown in FIGS. 3 to 12.

Using the input device 6, the user can now move a cursor 22 in the first display 15 of the digital image. A pixel of the image is tagged when it is brought into the centre of the cursor 22. In this way, the tagged pixel of the digital image is that pixel which is located in the centre of the cursor 22. If the cursor 22 moves over the first display 15 of the digital image, the tagged pixel of the digital image changes constantly.

The controller 4 captures which pixel of the digital image has been tagged using the input device 6. The computing unit 5 determines approximated space coordinates for the currently tagged pixel by accessing the visualisation equipment 3 and the memory 2. The space coordinates correspond to the surface element 9 visualised by the tagged pixel in the three-dimensional space. The approximated space coordinates are the depth information which is saved in connection with the digital image in the memory 2.

Subsequently, a limited three-dimensional environment of the approximated space coordinates determined for the tagged pixel is generated. In the exemplary embodiment described, a cube is formed which comprises the approximated space coordinates which belong to the tagged pixel. The data about this limited three-dimensional environment is used by the visualisation equipment to generate a second display of the points of the point cloud located within the limited three-dimensional environment. The second display 17 is superimposed over the first display 15 of the digital image as a supplementary view 16. As the second display 17 of the supplementary view 16 displays the three-dimensional environment surrounding the approximated space coordinates determined for the pixel tagged (by the cursor 22) in an enlarged display scale, the supplementary view 16 is also described as a magnified view.

Figure 3:
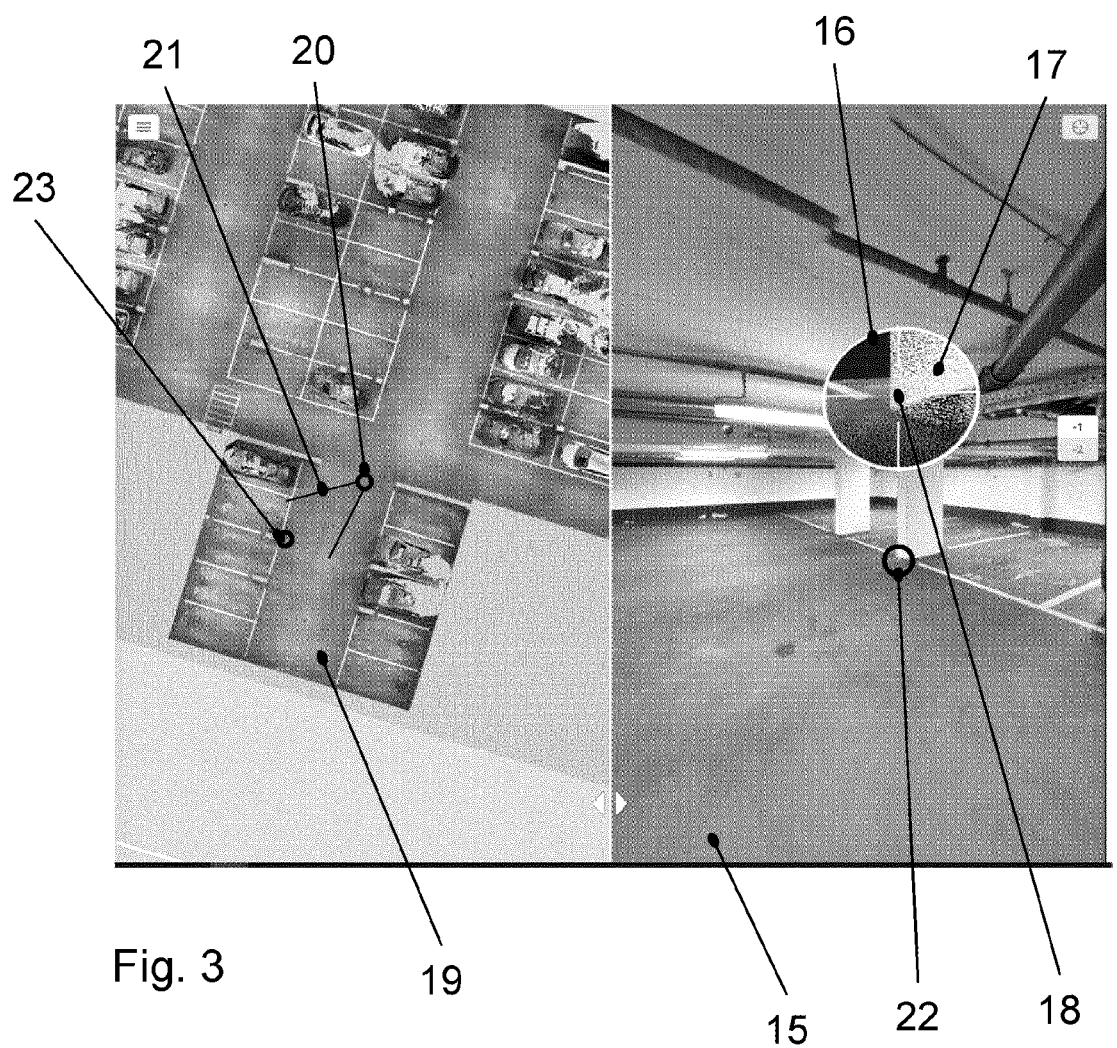
FIG. 3 shows a display generated by the exemplary embodiment of the method according to the invention.

In FIG. 3, the cursor 22 tags a pixel of the digital image in the first display 15, which visualises the beginning of a pillar. In the supplementary view 16, points of the point cloud are displayed for a limited three-dimensional environment of this area, said points visualising the beginning of the pillar in a different way. The pixel tagged in the digital image of the first display 15 is here displayed as a highlighted point 18 in the second display 17 of the supplementary view 16. In this way, it is a point 18 of the point cloud which is displayed in the second display 17, highlighted compared to other points of the point cloud in the limited three-dimensional environment. Unlike a pixel of the first display 15 of the digital image, the associated point 18 of the point cloud is visu to a measurement value of the laser scanner, by means of which the point cloud was generated. In this way, a particular point 18 of the point cloud can be selected via an operating process by means of the input device 6. The exact space coordinates of the selected point 18 of the point cloud can be determined by accessing the memory 2. In this way, a particular space coordinate can be selected very precisely, as the visual image visualises an overview of the surface elements 8, 9 in a three-dimensional space, but the selection of a particular space coordinate is takes place with the aid of the second display 17 of the supplementary view 16, which displays actually measured points of the point cloud, about which exact space coordinates are saved in the memory 2.

The limited three-dimensional environment of the space coordinates determined for the tagged pixel here comprises only points of the point cloud whose space coordinates are a distance away from the first recording position of the first camera 10 which is less than a threshold distance. Areas in the second display 17 in which points are located which are outside this limited three-dimensional environment are displayed in black. In this way the user can instantly recognise when the cursor 22 unintentionally tags a pixel in the first display 15 of the digital image which belongs to space coordinates that are located far behind the space coordinates of the pixel the user actually wants to mark. In this way, orientation when selecting the space coordinates is made easier for the user.

To offer the user a further orientation option, a second supplementary display 19 of the surface elements 8, 9 in the three-dimensional space is generated by means of the visualisation equipment 3 and displayed by means of the controller 4 and the display device 7. As shown in FIG. 3, the second supplementary view 19 shows the surface elements 8, 9 in the three-dimensional space from a different perspective from the first display 15 of the digital image. The three-dimensional space is shown from above.

In the second supplementary display 19, the first indicator 20 is shown for the first recording position of the first camera 10 and a second indicator 21 for the recording direction and the opening angle of the first camera 10. Furthermore, a third indicator 23 is shown for the approximated space coordinates of the pixel tagged in the first display 15. In this way the observer can very quickly and easily recognise whether they have tagged the desired surface element 9 or whether, in some cases, they have located the cursor 22 on a surface element 8 located far further back in the first display 15. The visualising pixel of the surface element 8 located further back can be next to the pixel which was supposed to be tagged. This, however, cannot be readily recognised in the two-dimensional projection of the first display 15. In the second supplementary display 19, however, it is possible to instantly recognise whether the third indicator is located on the pilar displayed or, for example, on the wall behind it.

In the second supplementary display 19, or in the first display 15 or in the second display 17 of the supplementary view 16, the distance of the approximated space coordinates determined for the tagged pixel from the first and/or second recording position can be shown in a further exemplary embodiment.

Figure 4:
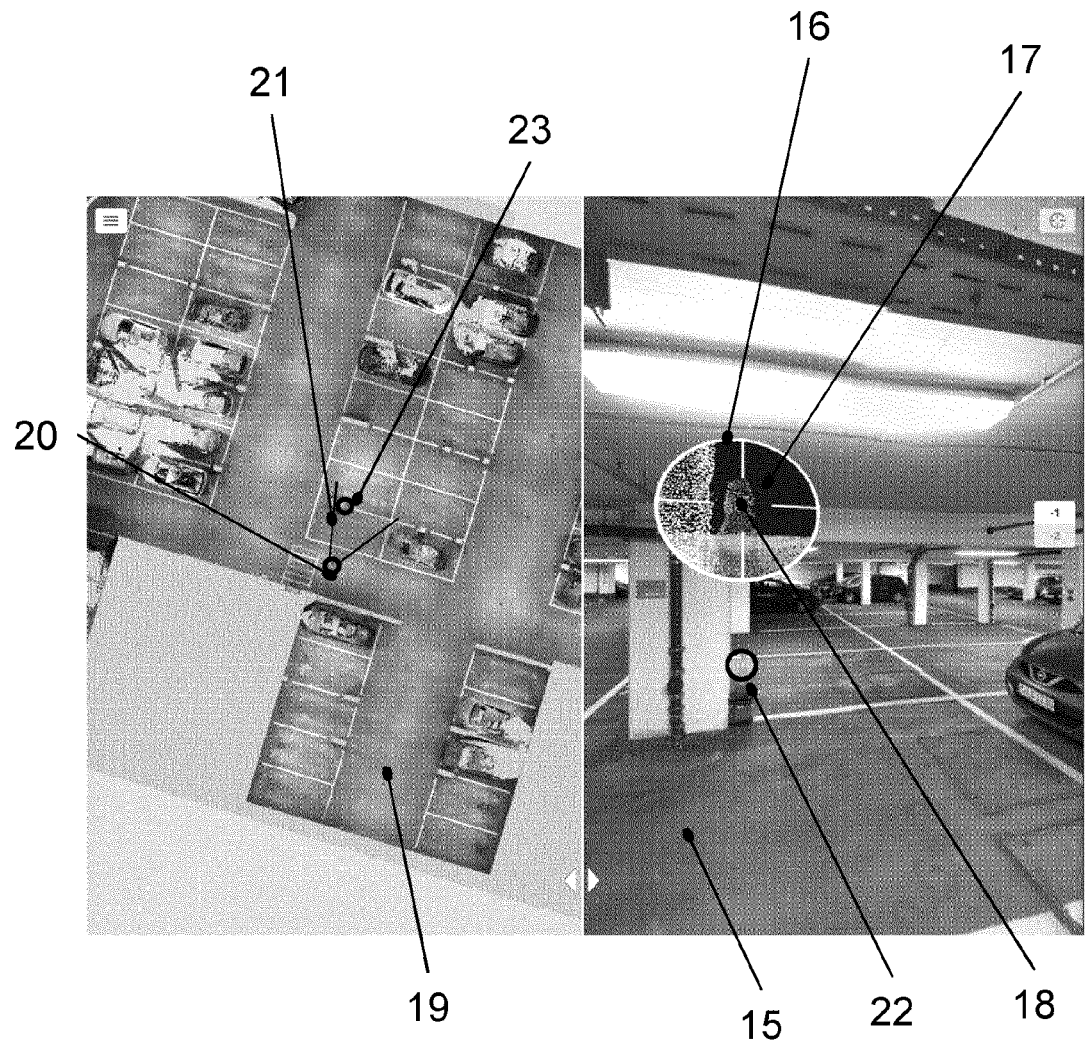
FIG. 4 shows a further display generated by the exemplary embodiment of the method according to the invention.

In FIG. 4, a further visual display of the display device 7 is shown, which has been generated by the method according to the invention. In this case, the space coordinates of a surface element 9 of a traffic cone is to be selected. In the first display 15 of the digital image, the traffic cone is realistic and easily recognisable. However, the depth information concerning the pixels of the traffic cone is imprecise. In the supplementary view 16, the traffic cone is harder to recognise, but points are displayed which correspond to exact measurement values of surface elements of the traffic cone. The user can select one of these points so that a space coordinate of a surface element of the traffic cone can be precisely selected.

The selection of a space coordinate of a ventilation pipe whose first display has artefacts is illustrated with reference to FIGS. 5 to 12. These artefacts have resulted from so-called stitching during the generation of a panorama image. Here, FIGS. 6, 8, 10 and 12 correspond to FIGS. 5, 7, 9 and 11, wherein respectively only one other display mode has been chosen.

FIGS. 5 and 6 show the first display 15, in which the ventilation pipe is arranged above a vehicle. Directly above the vehicle, an artefact can be seen in the ventilation pipe. The ventilation pipe is interrupted. This was not actually the case during the recording of the individual images of the three-dimensional space which contained the ventilation pipe.

Figure 7:
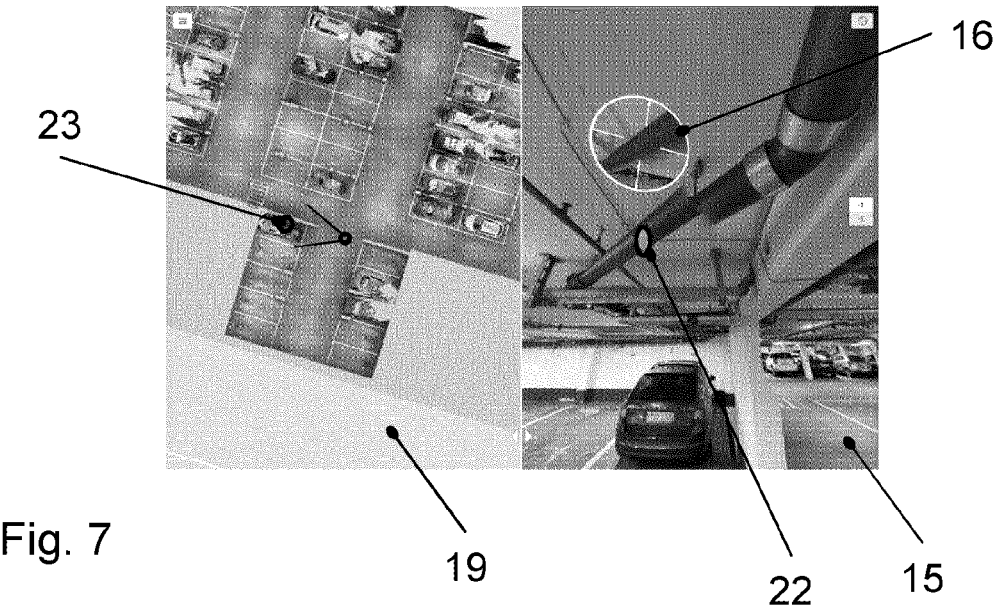
FIG. 7 shows another further display generated by the method according to the invention.
Figure 8:
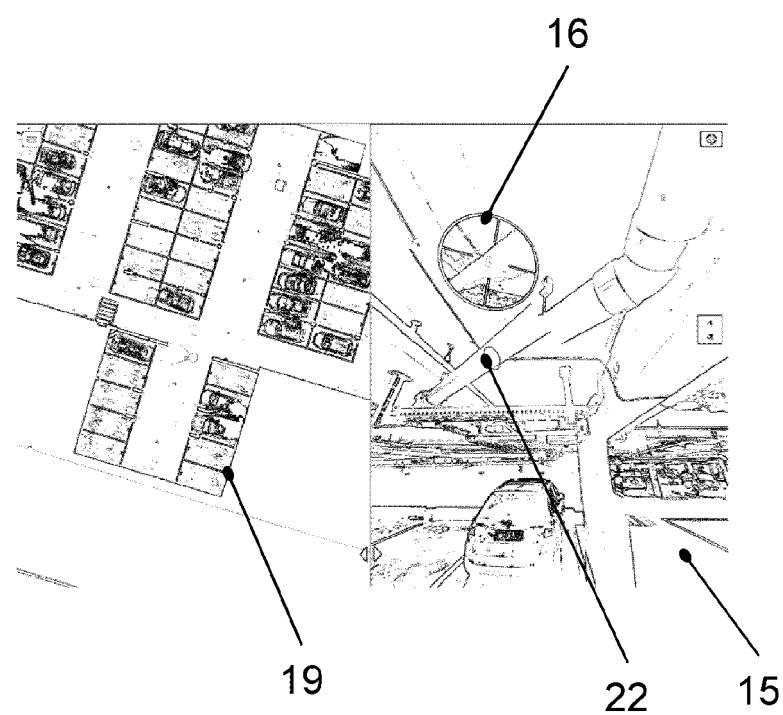
FIG. 8 shows an alternative display to the display shown in FIG. 7.

As shown in FIGS. 7 and 8, the user can now move the cursor 22 over the display of the ventilation pipe by means of the input device 6. A supplementary view 16 is superimposed, in which points of the point cloud which are located within the limited three-dimensional environment of the approximated space coordinates of the tagged pixel are displayed in the second display.

In the supplementary view 16, the normals and surface tangents of the surface element visualised by the tagged pixel can be shown in a further exemplary embodiment.

As shown in FIG. 6, the second supplementary view can also contain position indicators 24 for first recording positions during the recording of individual digital images of which the digital image is composed. In the first display, panorama images are shown which are associated with these position indicators 24.

Figure 9:
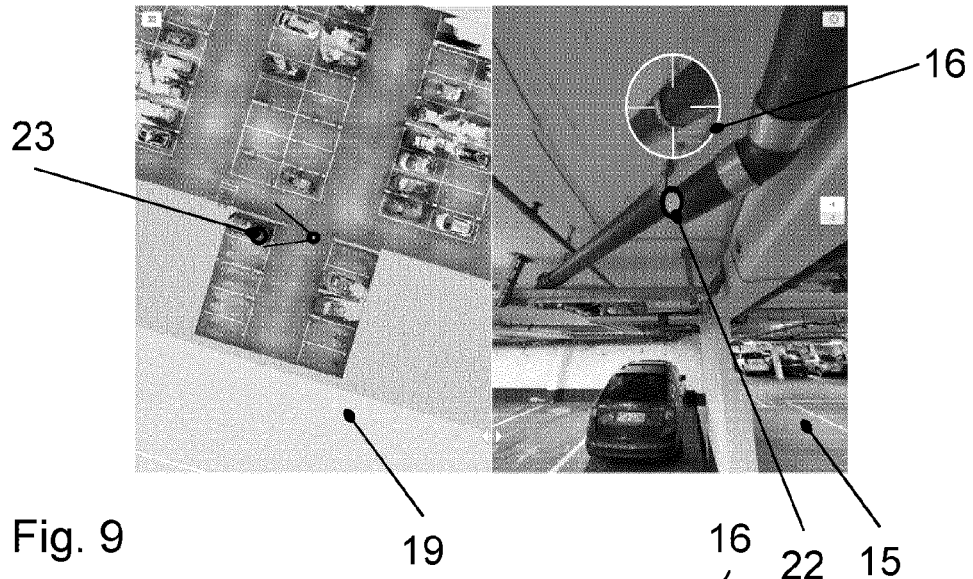
FIG. 9 shows another further display generated by the method according to the invention.
Figure 10:
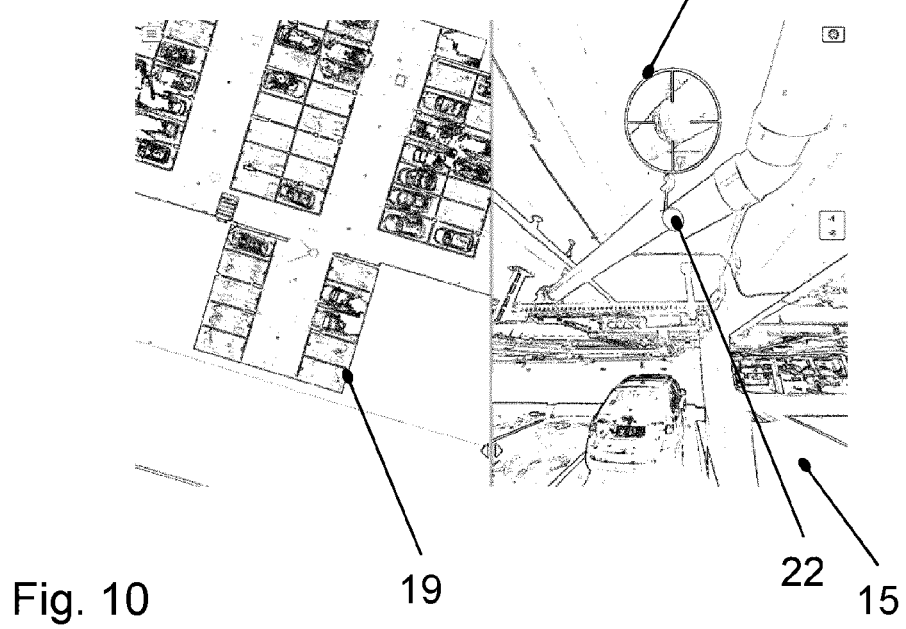
FIG. 10 shows an alternative display to the display shown in FIG. 9.

Now the user can move the cursor 22 in the first display over the artefact in the first display. In FIGS. 9 and 10, the cursor 22 is located directly on the artefact of the ventilation pipe in the first display of the digital image. As the points of the point cloud displayed in the second display visualise the measurement values of the laser scanner, however, there is no artefact in the supplementary view 16. The ventilation pipe is displayed correctly, without misalignment. By means of the supplementary view 16, the user can now select a point of the point cloud very precisely by moving the cursor 22, which is located on the ventilation pipe in the area of the artefact in the first display of the digital image 15. Such a precise selection would not be possible by means of the first display 15 of the digital image.

Figure 11:
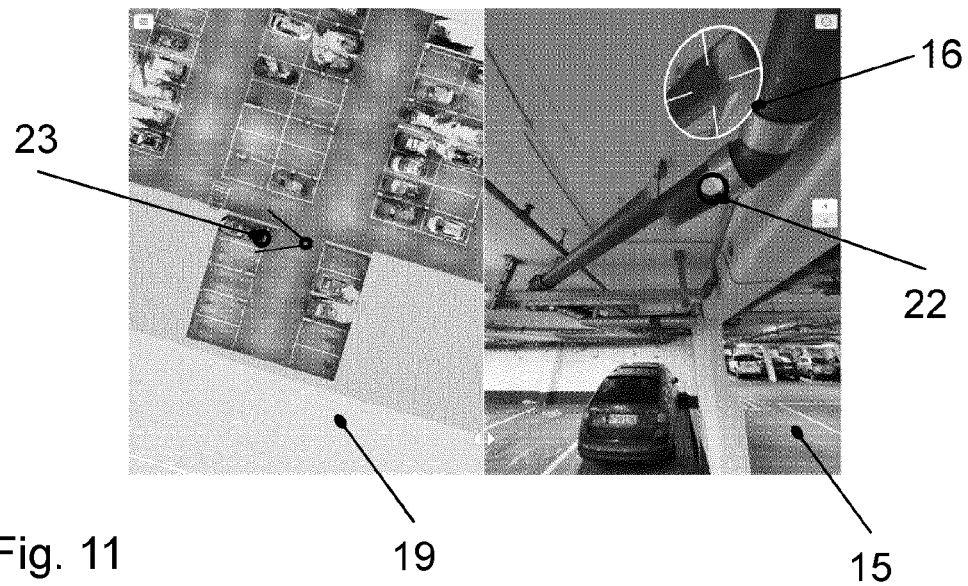
FIG. 11 shows another further display generated by the method according to the invention and FIG. 12 shows an alternative display to the display shown in FIG. 11.
Figure 12:
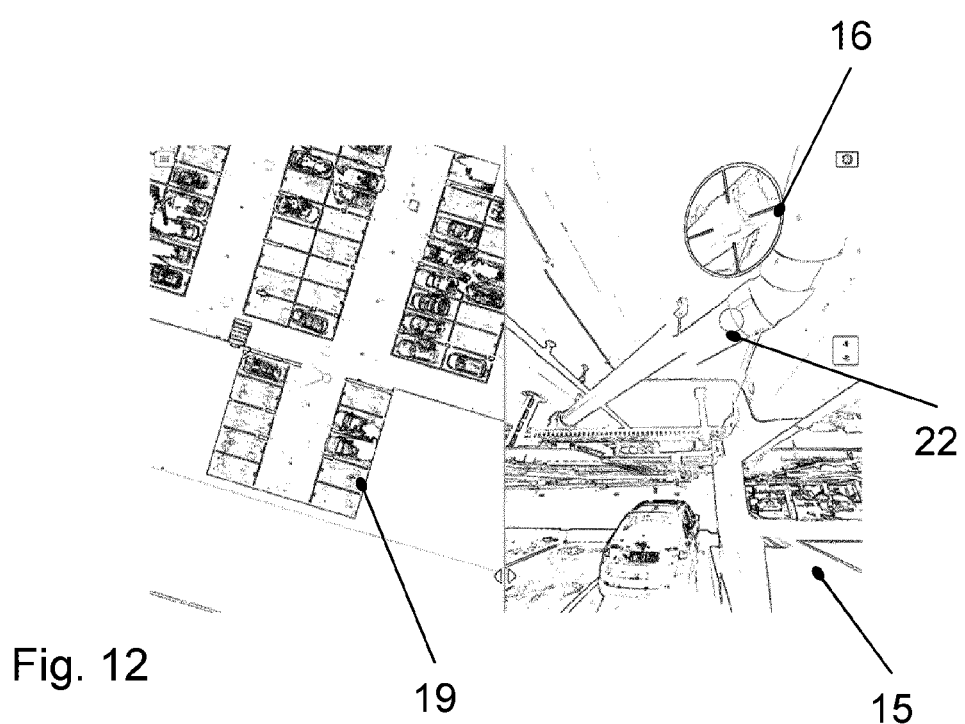

If the user moves the cursor 22 further over the first display of the ventilation pipe, as is displayed in FIGS. 11 and 12, the second display of the supplementary view 16 again substantially corresponds to the first display 15 of the digital image.

In the exemplary embodiment described here, the same surface elements were recorded from the digital image as were captured by the laser scanner during the generation of the point cloud. In an alternative exemplary embodiment, however, fewer surface elements can be captured by the laser scanner. For example, during the construction of a building, the three-dimensional space can be captured by the laser scanner at an earlier point in time than the recording of the individual images for the panorama image of the digital image. In this case, for example, the points of the point cloud can exclude particular surfaces, such as walls or ceilings, such that, in the supplementary view 16, it is possible to look through these surface elements 8, 9 which are shown in the first display 15. They are not displayed by points of the point cloud in the second display.

In an alternative exemplary embodiment, the second display 17 of the supplementary view 16 does not move immediately synchronously with the cursor 22 in the first display 15. Instead, in the first display 15 of the digital image, it is determined which pixels represent edges. If the cursor 22 is moved from a pixel which displays an edge to a pixel which does not belong to this edge, then the second display 17 is also displayed in the supplementary view 16 for the pixel which displays an edge, even if the cursor 22 is already located on the pixel which does not belong to the edge. Only when the cursor 22 is located on a pixel which is a specific distance from a pixel which represents an edge does the second display 17 of the supplementary view 16 jump to a display associated with a pixel of the first display 15, on which the cursor is located. Alternatively, this jump can also take place only when a specific number of further movement events has taken place after the edge pixel has been reached, or when a particular interval of time has passed.

By means of the method according to the invention, the distance between two points in the three-dimensional space can be easily determined. For this purpose, as illustrated above, a first and second point of the point cloud are selected. The spatial distance between the two points can then be calculated from the space coordinates relating to these two points.

In a similar way, a surface segment displayed in the digital image can also be cut out. For this purpose, a multiplicity of points of the point cloud displayed in the supplementary view 16 are selected. By means of the selected points, the surface segment in the digital image is then demarcated and cut out.

LIST OF REFERENCE NUMERALS 1 data processing equipment
2 memory
3 visualisation equipment
4 controller
5 computing unit
6 input device
7 display device
8 surface elements
9 surface element of a tagged pixel
10 first virtual or real camera
11 beams
12 straight line
13 second virtual camera
14 beams
15 first display
16 supplementary view
17 second display
18 point of the point cloud
19 second supplementary display
20 first indicator
21 second indicator
22 cursor
23 third indicator
24 position indicators

The invention claimed is:

1. A computer-implemented method for precise selection of a space coordinate by means of a digital image, the method comprising:
   providing a digital image of surface elements in a three-dimensional space, wherein the digital image is a panoramic image or a 2D image;
   providing a point cloud, wherein space coordinates are allocated to points that form the point cloud and surface elements are allocated to the points in the three-dimensional space;
   visualizing the surface elements in the three-dimensional space by a first display of the digital image;
   tagging a pixel of the digital image;
   determining approximate space coordinates for the tagged pixel, which correspond to the surface element visualized by the tagged pixel in the three-dimensional space;
   superimposing on the first display a supplementary view, which displays, in a second display, the points of the point cloud which are located in a limited three-dimensional environment of the approximate space coordinates ascertained by the tagged pixel; and
   selecting a point of the point cloud displayed in the supplementary view,
   wherein pixels representing an edge are determined in the first display, and
   wherein when a cursor of an input device is moved from a pixel which displays the edge to a pixel which does not belong to the edge, the second display is then subsequently also displayed in the supplementary view for the pixel which displays the edge if the cursor of the input device is already located on the pixel which does not belong to the edge.

2. The method according to claim 1, wherein the digital image of the surface elements of the three-dimensional space is visualised by a two-dimensional projection from a first recording pose in a first recording position with a first opening angle of a first virtual or real camera in the direction of the recorded three-dimensional space.

3. The method according to claim 2, wherein a second recording pose is allocated to the second display of the supplementary view in a second recording position, and a second opening angle is allocated to a second virtual camera, the opening angle determining the perspective of the display of the limited three-dimensional environment.

4. The method according to claim 1, wherein the display scale of the second display of the supplementary view is larger than the display scale of the first display of the digital image.

5. The method according to claim 1, wherein the limited three-dimensional environment of the space coordinates ascertained by the tagged pixel only comprises points whose space coordinates have a distance from the first and/or second recording position which is smaller than a threshold distance.

6. The method according to claim 3, wherein a second supplementary display of the surface elements or of the points of the point cloud in the three-dimensional space is generated and displayed,
   wherein the second supplementary display shows the three-dimensional space from a different perspective than the first display of the digital image, and
   in the second supplementary display, a first indicator for the first recording position and/or a second indicator for the recording direction and/or the opening angle of the first virtual or real camera and/or a third indicator for the approximate space coordinates of the tagged pixel is/are displayed.

7. The method according to claim 1, wherein space coordinates are allocated to a point of the point cloud, in which a surface element is located which has diverted a laser beam of a laser scanner during the capture of the three-dimensional space.

8. The method according to claim 1, wherein no points of the point cloud are allocated to a subset of the surface elements which are visualized in the first display of the digital image, so that the point cloud displays fewer surface elements than the digital image.

9. A computer-implemented measuring method for determination of distance between two points in three-dimensional space, the method comprising:
   selecting a first point in the point cloud displayed in the supplementary view by means of the method according to claim 1;

determining first space coordinates of the first point;
selecting a second point of the point cloud displayed in the supplementary view by means of the method according to claim 1;
determining second space coordinates of the second point; and
calculating the distance between the first point and the second point from the first and second space coordinates.

10. A device for precise selection of a space coordinate by means of a digital image, the device comprising:
 a memory, in which data about at least one digital image of surface elements, and about a point cloud, is saved in a three-dimensional space, wherein space coordinates are allocated to the points which form the point cloud and surface elements are allocated to the points in the three-dimensional space;
 visualization equipment, linked to the memory through a datalink, and equipped to visualize the surface elements in the three-dimensional space by a first display of the digital image;
 an input device for tagging of a pixel of the digital image by means of a pointer; and
 a calculator unit, which is equipped to determine approximate space coordinates for the tagged pixel, which correspond to the surface element visualized by the marked pixel in three-dimensional space, wherein determining approximate space coordinates comprises projecting the tagged pixel onto a surface element in the three-dimensional space,
 wherein the visualization equipment is further equipped to, in response to the selection of the pixel, automatically generate and superimpose a supplementary view on the first display which displays, in a second display, a subset of points of the point cloud located in a limited three-dimensional environment of the approximate space coordinates determined for the tagged pixel,
 wherein the limited three-dimensional environment comprises points of the point cloud within a predefined radius around the approximate space coordinates,
 wherein the subset of points is displayed at a larger scale than the first display,
 wherein a point of the point cloud depicted in the supplementary view is selectable with the input device,
 wherein when a cursor moves from a pixel displaying an edge to a pixel not belonging to that edge, the second display is subsequently displayed in the supplementary view for the pixel displaying the edge if the cursor is already located on the pixel not belonging to the edge, and
 wherein the digital image is a panoramic image or a 2D image.

* * * * *